United States Patent
Gu et al.

(10) Patent No.: US 11,727,610 B2
(45) Date of Patent: Aug. 15, 2023

(54) SYSTEM AND METHOD FOR IMAGE PROCESSING

(71) Applicant: SHANGHAI UNITED IMAGING HEALTHCARE CO., LTD., Shanghai (CN)

(72) Inventors: Xiaoyue Gu, Shanghai (CN); Tianyi Xu, Shanghai (CN); Youjun Sun, Shanghai (CN); Weiping Liu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 264 days.

(21) Appl. No.: 17/159,101

(22) Filed: Jan. 26, 2021

(65) Prior Publication Data

US 2021/0150785 A1 May 20, 2021

Related U.S. Application Data

(63) Continuation of application No. 15/952,187, filed on Apr. 12, 2018, now Pat. No. 10,909,731.

(30) Foreign Application Priority Data

Apr. 25, 2017 (CN) .......................... 201710277460.2

(51) Int. Cl.
*G06K 9/00* (2022.01)
*G06T 11/00* (2006.01)
(Continued)

(52) U.S. Cl.
CPC .............. *G06T 11/008* (2013.01); *G06T 5/50* (2013.01); *G06T 7/11* (2017.01); *G06T 7/32* (2017.01);
(Continued)

(58) Field of Classification Search
None
See application file for complete search history.

(56) References Cited

U.S. PATENT DOCUMENTS 6,490,476 B1 12/2002 Townsend et al.
2004/0260176 A1 12/2004 Wollenweber et al.
(Continued)

FOREIGN PATENT DOCUMENTS

| CN | 103054606 A | 4/2013 |
| CN | 105147312 A | 12/2015 |
| CN | 105976413 A | 9/2016 |

OTHER PUBLICATIONS

First Office Action in Chinese Application No. 201710277460.2 dated Nov. 29, 2019, 9 pages.

*Primary Examiner* — Wei Wen Yang
(74) *Attorney, Agent, or Firm* — Metis IP LLC

(57) ABSTRACT

The disclosure relates to a system and method for correcting PET image data. PET image data of a first part of a subject may be obtained. CT image data of a second part of the subject may be obtained. The first part may include the second part. PET voxel data of the first part may be obtained based on the PET image data of the first part. A relationship between the CT image data and PET voxel data of the second part may be determined. CT image data of a third part of the subject may be determined based on the relationship and PET voxel data of the third part. The first part may include the third part. An attenuation map may be determined based on the CT image data of the second part and the third part. The PET image data of the first part may be corrected based on the attenuation map.

20 Claims, 11 Drawing Sheets

(51) Int. Cl.
*G06T 7/11* (2017.01)
*G06T 5/50* (2006.01)
*G06T 7/32* (2017.01)

(52) U.S. Cl.
CPC .. *G06T 11/005* (2013.01); *G06T 2207/10081* (2013.01); *G06T 2207/10104* (2013.01); *G06T 2207/30008* (2013.01)

(56) References Cited

U.S. PATENT DOCUMENTS

| | | |
|---|---|---|
| 2007/0167716 A1 | 7/2007 | Kinahan et al. |
| 2008/0073543 A1 | 3/2008 | Vija et al. |
| 2013/0266198 A1 | 10/2013 | Pereira et al. |
| 2014/0133728 A1* | 5/2014 | Blaffert ................ G06T 7/0012 382/131 |
| 2016/0116603 A1 | 4/2016 | Chen et al. |
| 2019/0304144 A1 | 10/2019 | Feng et al. |

* cited by examiner

SYSTEM AND METHOD FOR IMAGE PROCESSING

CROSS-REFERENCE TO RELATED APPLICATIONS

This present application is a Continuation of U.S. patent application Ser. No. 15/952,187 filed on Apr. 12, 2018, which claims priority to Chinese Patent Application No. 201710277460.2 filed on Apr. 25, 2017, the entire content of each of which is hereby incorporated by reference.

TECHNICAL FIELD

This present disclosure generally relates to image processing, and more particularly, relates to a system and method for attenuation correction in image reconstruction.

BACKGROUND

A positron emission tomography/computed tomography (PET/CT) device is a combination of a PET scanner and a CT scanner. In PET imaging, a radioactive tracer isotope may be injected into a subject to be scanned, and then annihilation events induced by the tracer isotope in the subject may be detected by one or more detectors. One or more tomography images may be obtained based on the annihilation events. The CT scanner may be configured to obtain accurate distribution of the radioactive tracer isotope in the subject. Therefore, the PET/CT device has the advantages of both the PET scanner and the CT scanner.

In PET imaging, a quantitative reconstruction of a tracer distribution requires attenuation correction. An attenuation map may be needed for attenuation correction. The attenuation map may be typically acquired through a transmission scan using the CT scanner, and then a corrected PET image may be determined based on the attenuation map. In some situations, if a whole body of the subject is scanned using the CT scanner, a larger dose of radiation may be introduced to the subject, in comparison with that introduced to the subject when a partial body of the subject is scanned. Therefore, it would be desirable to provide effective mechanisms for attenuation correction with reduced radiation doses in CT scanning.

SUMMARY

One aspect of the present disclosure is directed to a method for correcting PET image data. The method may include one or more of the following operations. PET image data of a first part of a subject may be obtained. CT image data of a second part of the subject may be obtained. The first part may include the second part. PET voxel data of the first part may be obtained based on the PET image data of the first part. A relationship between the CT image data and PET voxel data of the second part may be determined. CT image data of a third part of the subject may be determined based on the relationship and PET voxel data of the third part. The first part may include the third part. An attenuation map may be determined based on the CT image data of the second part and the third part. The PET image data of the first part may be corrected based on the attenuation map.

Another aspect of the present disclosure is directed to a system including at least one storage device and at least one processor. The at least one storage device may include a set of instructions or programs. The at least one processor may be configured to communicate with the at least one storage device. When executing the set of instructions or programs, the at least one processor may be configured to cause the system to perform one or more of the following operations. PET image data of a first part of a subject may be obtained. CT image data of a second part of the subject may be obtained. The first part may include the second part. PET voxel data of the first part may be obtained based on the PET image data of the first part. A relationship between the CT image data and PET voxel data of the second part may be determined. CT image data of a third part of the subject may be determined based on the relationship and PET voxel data of the third part. The first part may include the third part. An attenuation map may be determined based on the CT image data of the second part and the third part. The PET image data of the first part may be corrected based on the attenuation map.

Yet another aspect of the present disclosure is directed to a non-transitory computer readable medium embodying a computer program product. The computer program product may include instructions configured to cause a computing device to perform one or more of the following operations. PET image data of a first part of a subject may be obtained. CT image data of a second part of the subject may be obtained. The first part may include the second part. PET voxel data of the first part may be obtained based on the PET image data of the first part. A relationship between the CT image data and PET voxel data of the second part may be determined. CT image data of a third part of the subject may be determined based on the relationship and PET voxel data of the third part. The first part may include the third part. An attenuation map may be determined based on the CT image data of the second part and the third part. The PET image data of the first part may be corrected based on the attenuation map.

In some embodiments, the first part may be a whole body of a subject, and the second part may be thorax, abdomen, upper limb, or lower limb of the subject.

In some embodiments, the obtaining of PET voxel data of the first part based on the PET image data of the first part may include one or more of the following operations. A PET image may be reconstructed based on the PET image data of the first part, wherein the PET image of the first part may include PET voxel data of the first part.

In some embodiments, the relationship between the CT image data and PET voxel data of the second part may be stored in a storage unit.

In some embodiments, the determination of CT image data of a third part based on the relationship and PET voxel data of the third part may include one or more of the following operations. The PET image of the third part may be segmented into an osseous tissue region and a non-osseous tissue region. PET voxel data of the osseous tissue region may be obtained. CT image data of the osseous tissue region may be determined based on the relationship and the PET voxel data of the osseous tissue region.

In some embodiments, the determination of the CT image data of the osseous tissue region may include determining the CT image data of the osseous tissue region by interpolation or fitting.

In some embodiments, the determination of an attenuation map based on the CT image data of the second part and the third part may include one or more of the following operations. A first set of attenuation coefficients may be determined based on the CT image data of the osseous tissue region of the third part. A second set of attenuation coefficients of the non-osseous tissue region of the third part may be determined. A third set of attenuation coefficients may be determined based on the CT image data of the second part. An attenuation map of the first part may be determined based on the first set of attenuation coefficients, the second set of attenuation coefficients, and the third set of attenuation coefficients.

In some embodiments, the first set of attenuation coefficients may be determined further based on a first linear conversion relation.

In some embodiments, the second set of attenuation coefficients may be determined based on a second linear conversion relation, or the second set of attenuation coefficients may be set as a value equal to the attenuation coefficient of water.

In some embodiments, the method may further include one or more of the following operations. A corrected PET image may be generated based on the corrected PET image data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
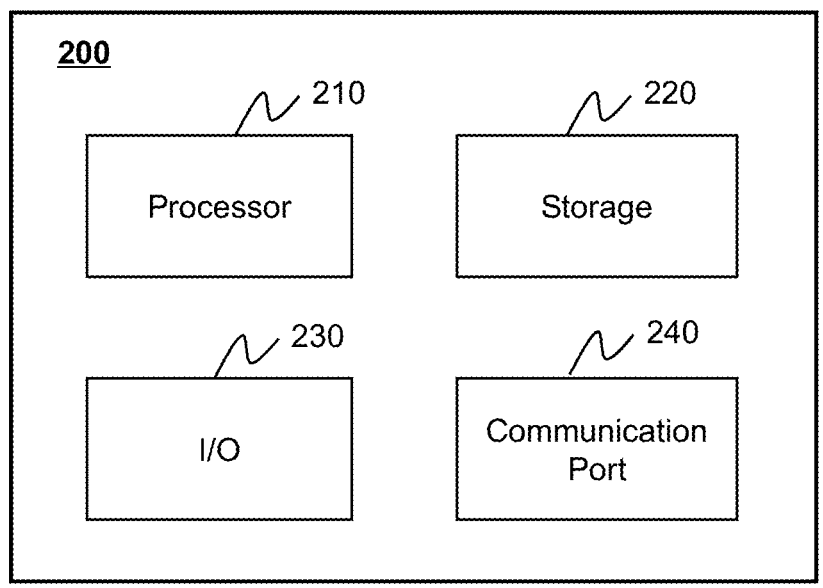
FIG. 2 is a schematic diagram illustrating exemplary hardware and/or software components of an exemplary computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "construction" and "reconstruction," when used in this disclosure, may represent a similar process in which an image may be transformed from data. Moreover, the phrase "image processing" and the phrase "image generation" may be used interchangeably. In some embodiments, image processing may include image generation.

The present disclosure provided herein relates to an image processing system and method. Specifically, the method may be related to parameter correction during an imaging process. The method and system may be used in image reconstruction based on various image data acquired by ways of, for example, a positron emission tomography (PET) system, a computed tomography (CT) system, or the like, or a combination thereof. Specifically, the method and system may be used in a PET/CT imaging device. In some embodiments, the image generated by the PET/CT imaging device may include a 2D image, a 3D image, a 4D image, and/or any related image data (e.g., projection data). It should be noted that the above description of the image processing system and method is merely provided for the purposes of illustration, and not intended to limit the scope of the present disclosure. For persons having ordinary skills in the art, multiple variations, changes, and/or modifications may be made under the guidance of the present disclosure. However, those variations, changes, and/or modifications do not depart from the scope of the present disclosure.

Figure 1:
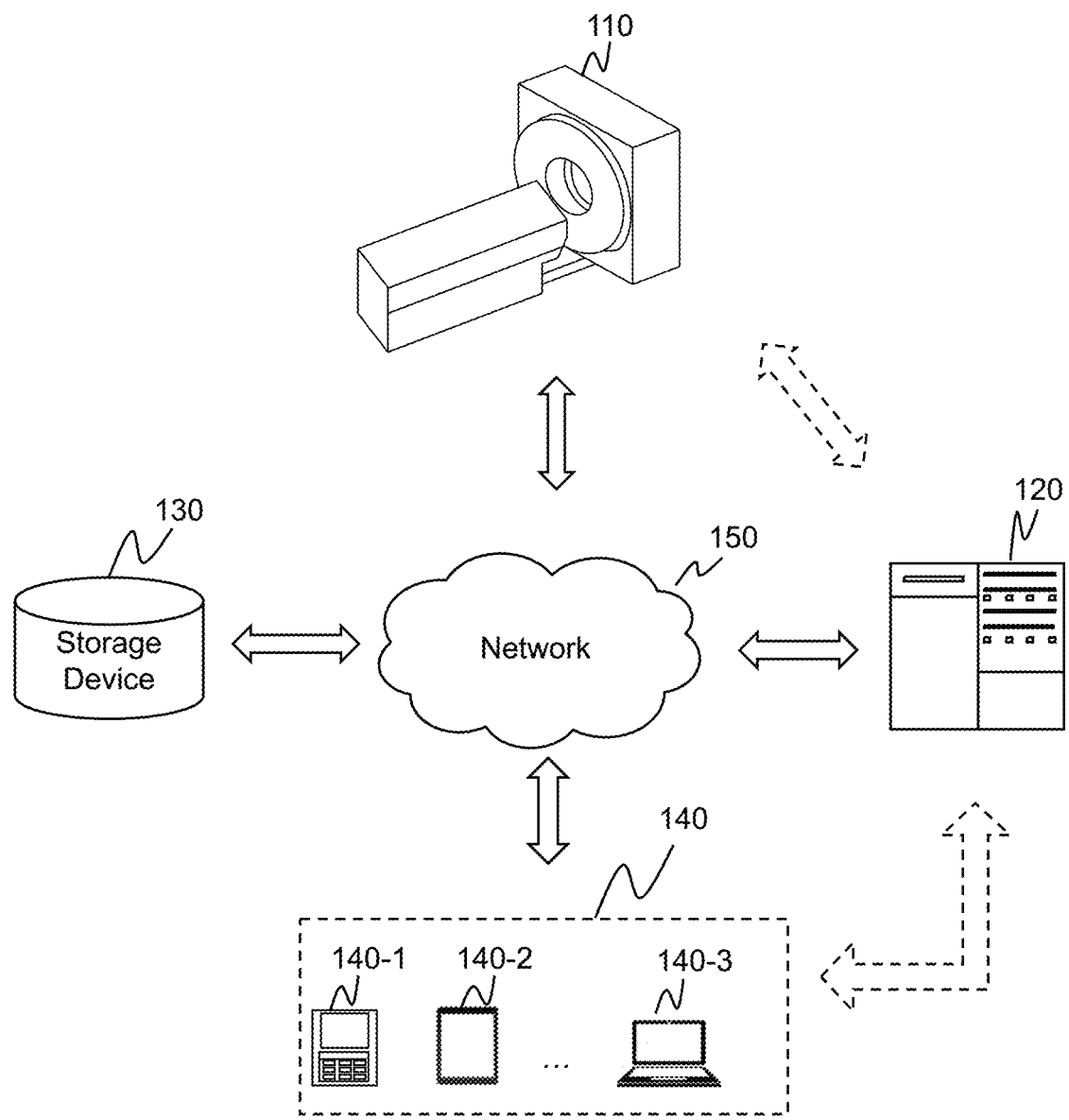
FIG. 1 is a schematic diagram illustrating an exemplary imaging system according to some embodiments of the present disclosure.

FIG. 1 is a schematic diagram illustrating an exemplary imaging system according to some embodiments of the present disclosure. As shown, the imaging system 100 may include a scanner 110, a processing device 120, a storage device 130, one or more terminals 140, and a network 150.

The components in the imaging system 100 may be connected in one or more of various ways. Merely by way of example, as illustrated in FIG. 1, the scanner 110 may be connected to the processing device 120 through the network 150. As another example, the scanner 110 may be connected to the processing device 120 directly as indicated by the bi-directional arrow in dotted lines linking the scanner 110 and the processing device 120. As a further example, the storage device 130 may be connected to the processing device 120 directly or through the network 150. As still a further example, one or more terminals 140 may be connected to the processing device 120 directly (as indicated by the bi-directional arrow in dotted lines linking the terminal 140 and the processing device 120) or through the network 150.

The scanner 110 may generate or provide image data via scanning a subject or a part of the subject. In some embodiments, the scanner 110 may be a medical imaging device, for example, a PET device, a SPECT device, a CT device, or the like, or any combination thereof (e.g., a PET-CT device). In some embodiments, the scanner 110 may include a single-modality scanner. The single-modality scanner may include, for example, a computed tomography (CT) scanner, and/or a positron emission tomography (PET) scanner. In some embodiments, the scanner 110 may include both the CT scanner and the PET scanner. In some embodiments, image data of different modalities related to the subject, such as CT image data and PET image data, may be acquired using different scanners separately. In some embodiments, the scanner 110 may include a multi-modality scanner. In some embodiments, the multi-modality scanner may include a positron emission tomography-computed tomography (PET-CT) scanner. The multi-modality scanner may perform multi-modality imaging simultaneously. For example, the PET-CT scanner may generate structural X-ray CT image data and functional PET image data simultaneously in a single scan.

In some embodiments, the subject may include a body, a substance, or the like, or any combination thereof. In some embodiments, the subject may include a specific portion of a body, such as a head, a thorax, an abdomen, an upper limb, a lower limb, or the like, or any combination thereof. In some embodiments, the subject may include a specific organ, such as an esophagus, a trachea, a bronchus, a stomach, a gallbladder, a small intestine, a colon, a bladder, a ureter, a uterus, a fallopian tube, a knee joint, an ankle joint, a thigh bone, a shin bone, etc. In some embodiments, the subject may include a physical model (also referred to as a mockup). The physical model may include one or more materials constructed as different shapes and/or dimensions. Different parts of the physical model may be made of different materials. Different materials may have different X-ray attenuation coefficients, different tracer isotopes, and/or different hydrogen proton contents. Therefore, different parts of the physical model may be recognized by the imaging system 100. In the present disclosure, "object" and "subject" are used interchangeably. In some embodiments, the scanner 110 may include a scanning table. The subject may be placed on the scanning table for imaging.

In some embodiments, the scanner 110 may transmit the image data via the network 150 to the processing device 120, the storage device 130, and/or the terminal(s) 140. For example, the image data may be sent to the processing device 120 for further processing, or may be stored in the storage device 130.

The processing device 120 may process data and/or information obtained from the scanner 110, the storage device 130, and/or the terminal(s) 140. For example, the processing device 120 may correct PET image data based on an attenuation map. In some embodiments, the processing device 120 may be a single server or a server group. The server group may be centralized or distributed. In some embodiments, the processing device 120 may be local or remote. For example, the processing device 120 may access information and/or data from the scanner 110, the storage device 130, and/or the terminal(s) 140 via the network 150. As another example, the processing device 120 may be directly connected to the scanner 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as described in connection with FIG. 2.

The storage device 130 may store data, instructions, and/or any other information. In some embodiments, the storage device 130 may store data obtained from the scanner 110, the processing device 120, and/or the terminal(s) 140. In some embodiments, the storage device 130 may store data and/or instructions that the processing device 120 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform as described elsewhere in the disclosure. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be part of the processing device 120.

The terminal(s) 140 may be connected to and/or communicate with the scanner 110, the processing device 120, and/or the storage device 130. For example, the terminal(s) 140 may obtain a processed image from the processing device 120. As another example, the terminal(s) 140 may obtain image data acquired by the scanner 110 and transmit the image data to the processing device 120 to be processed. In some embodiments, the terminal(s) 140 may include a mobile device 140-1, a tablet computer 140-2, a laptop computer 140-3, or the like, or any combination thereof. For example, the mobile device 140-1 may include a mobile phone, a personal digital assistance (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120.

The network 150 may include any suitable network that can facilitate exchange of information and/or data for the imaging system 100. In some embodiments, one or more components of the imaging system 100 (e.g., the scanner 110, the processing device 120, the storage device 130, the terminal(s) 140, etc.) may communicate information and/or data with one or more other components of the imaging system 100 via the network 150. For example, the processing device 120 may obtain image data from the scanner 110 via the network 150. As another example, the processing device 120 may obtain user instruction(s) from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 130 may be a data storage including cloud computing platforms, such as, public cloud, private cloud, community, and hybrid clouds, etc. However, those variations and modifications do not depart from the scope of the present disclosure.

FIG. 2 is a schematic diagram illustrating exemplary hardware and/or software components of an exemplary computing device on which the processing device may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal(s) 140, the storage device 130, and/or any other component of the Imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the scanner 110, the terminal(s) 140, the storage device 130, and/or any other component of the Imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 120 for determining one or more registration parameters related to multi-modality images acquired by the imaging system 100.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 150) to facilitate data communications. The communication port 240 may establish connections between the processing device 120 and the scanner 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
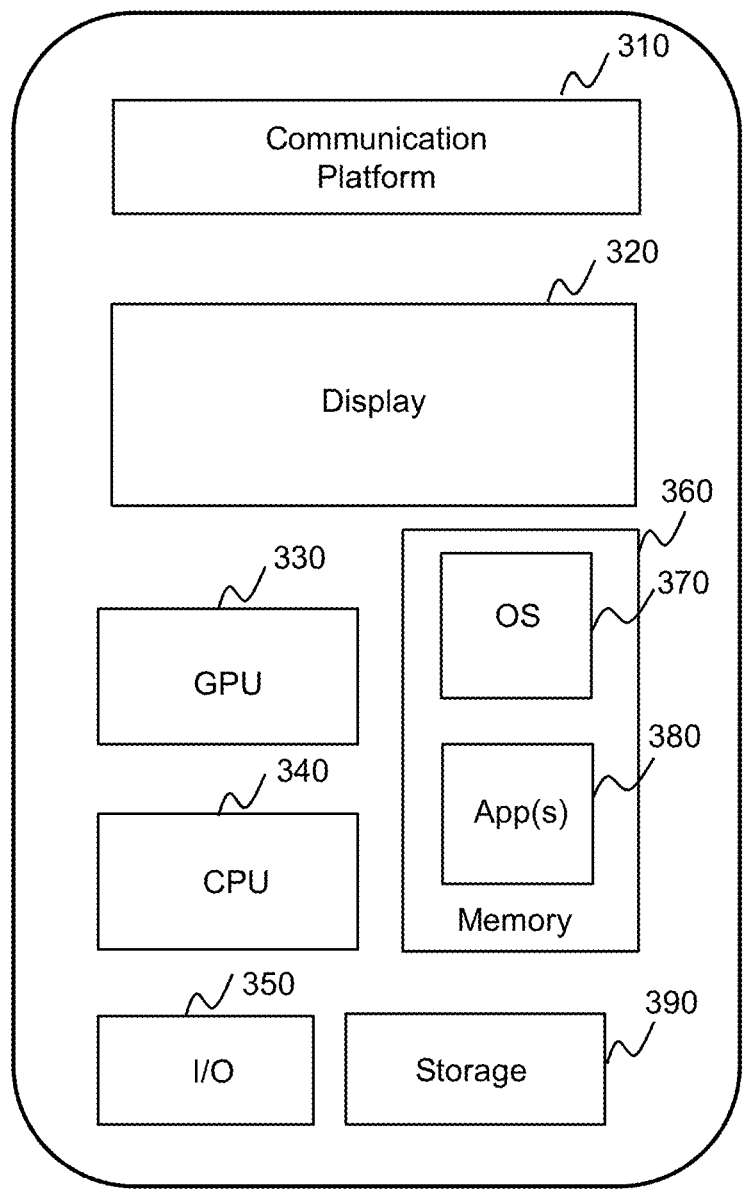
FIG. 3 is a schematic diagram illustrating exemplary hardware and/or software components of an exemplary mobile device on which the terminal may be implemented according to some embodiments of the present disclosure.

FIG. 3 is a schematic diagram illustrating exemplary hardware and/or software components of an exemplary mobile device on which the terminal may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information respect to image processing or other information from the processing device 120. User interactions with the information stream may be achieved via the I/O 350 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or external device. A computer may also act as a server if appropriately programmed.

Figure 4:
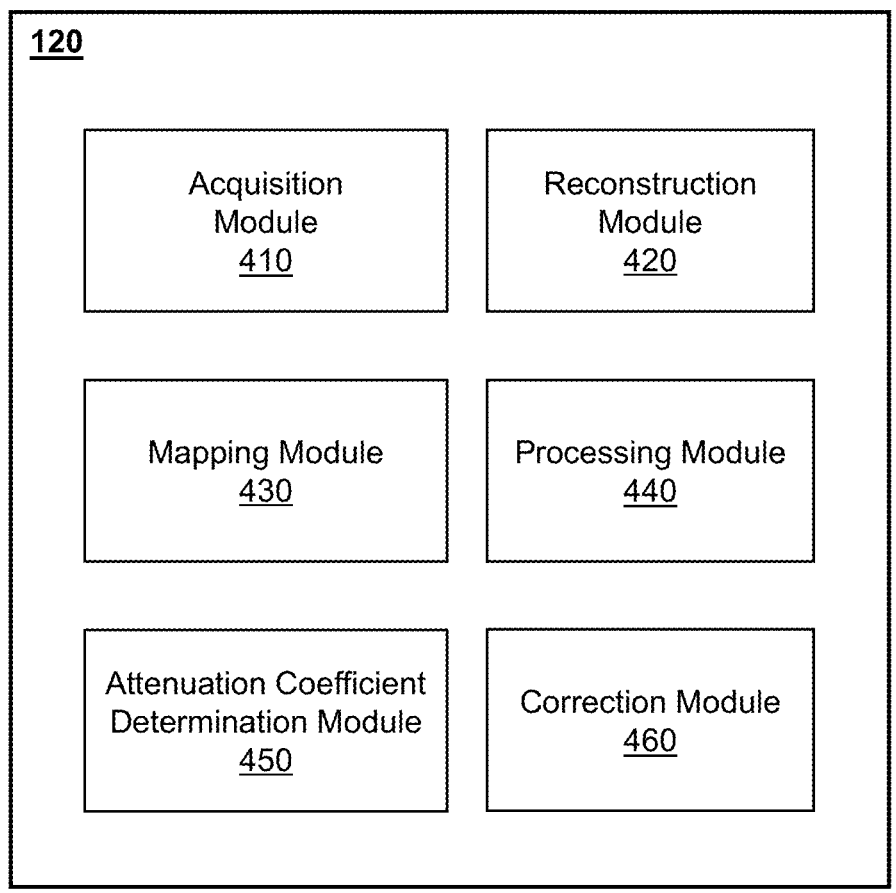
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may be implemented on the computing device 200 (e.g., the processor 210) illustrated in FIG. 2 or the mobile device 300 (e.g., the CPU 340) illustrated in FIG. 3. The processing device 120 may include an acquisition module 410, a reconstruction module 420, a mapping module 430, a processing module 440, an attenuation coefficient determination module 450, and a correction module 460.

The acquisition module 410 may be configured to acquire data. Specifically, the acquisition module 410 may acquire data via the communication port 240 or the I/O 230 shown in FIG. 2, or the communication platform 310 or the I/O 350 shown in FIG. 3.

In some embodiments, the acquisition module 410 may acquire data from the scanner 110 or the storage device 130, or data delivered by a user through the terminal 140. For example, the acquisition module 410 may receive PET image data and/or CT image data for reconstructing medical images from the scanner 110. As another example, the acquisition module 410 may receive reconstructed medical images to be processed from the storage device 130 or from the terminal 140. As a further example, the acquisition module 410 may receive control instructions inputted by a user through the terminal 140 or stored in the storage device 130. In some embodiments, the acquisition module 410 may output data to other components or parts in the processing device 120 or to the terminal 140. For example, images reconstructed by the processing device 120 may be transmitted to the storage device 130 from the acquisition module 410. As another example, intermediate data during processing such as attenuation coefficients may be delivered to the storage 120 from the acquisition module 410. In some embodiments, the CT image data received by the acquisition module 410 may be transmitted to the mapping module 430 via the communication port 240 or the I/O 230 shown in FIG. 2, or the communication platform 310 or the I/O 350 shown in FIG. 3.

The reconstruction module 420 may reconstruct one or more images based on image data. For example, the reconstruction module 420 may reconstruct a PET image based on PET image data. As another example, the reconstruction module 420 may reconstruct a CT image based on CT image data. In some embodiments, the reconstruction module 420 may transmit the reconstructed PET image and/or CT image to the mapping module 430. In some embodiments, the reconstruction module 420 may reconstruct a corrected PET image based on corrected PET image data. The reconstruction module 420 may reconstruct an image based on one or more reconstruction techniques described in the present disclosure. More descriptions of the reconstruction of the PET image and/or the CT image may be found elsewhere in the present disclosure (e.g., FIG. 5 and the description thereof).

The mapping module 430 may determine a relationship between CT image data and PET voxel data. In some embodiments, the mapping module 430 may receive the CT image data from the acquisition module 410. In some embodiments, mapping module 430 may receive the reconstructed PET image from the reconstruction module 420 or the acquisition module 410. For example, the PET image may be reconstructed by the reconstruction module 420 and then stored in the storage device 130. In some embodiments, the mapping module 430 may extract the PET voxel data of the PET image and determine a relationship between the CT image data and the PET voxel data. In some embodiments, the mapping module 430 may include a storage unit (not shown in FIG. 4), in which the relationship may be stored. More description of the relationship may be found elsewhere in the present disclosure (e.g., FIG. 5 and the description thereof).

In some embodiments, the processing module 440 may determine CT image data based on the relationship and PET voxel data. In some embodiments, the processing module 440 may obtain projection data by performing forward projection on an attenuation map. In some embodiments, the processing module 440 may receive PET voxel data and the relationship from the mapping module 430, the reconstruction module 420, the acquisition module 410, and/or the storage device 130. In some embodiments, the processing module 440 may receive the attenuation map from the acquisition module 410, the attenuation coefficient determination module 450, and/or the storage device 130.

The attenuation coefficient determination module 450 may determine one or more attenuation coefficients. In some embodiments, the attenuation coefficient determination module 450 may determine the attenuation coefficients based on the CT image data and/or one or more conversion relations. In some embodiments, the attenuation coefficient determination module 450 may determine a first sets of attenuation coefficients based on a first conversion relation. In some embodiments, the attenuation coefficient determination module 450 may determine a second sets of attenuation coefficients based on a second conversion relation. In some embodiments, the attenuation coefficient determination module 450 may determine a third sets of attenuation coefficients based on the first conversion relation and/or the second conversion relation. In some embodiments, the attenuation coefficient determination module 450 may determine an attenuation map based on the first, the second, and the third sets of attenuation coefficients. In some embodiments, the attenuation coefficient determination module 450 may receive CT image data from the acquisition module 410, the reconstruction module 420, and/or the storage device 130.

The correction module 460 may receive PET image data and an attenuation map. In some embodiments, the correction module 460 may receive the PET image data from the scanner 110, the storage device 130, and/or the reconstruction module 420. In some embodiments, the correction module 460 may correct the PET image data based on the attenuation map. In some embodiments, the correction module 460 may perform forward projection on the attenuation map to obtain projection data. Then the correction module 460 may correct the PET image data based on the projection data. In some embodiments, the correction module 460 may generate a corrected PET image based on the corrected PET image data. In some embodiments, the correction module 460 may correct the PET image data based on one or more correction techniques described elsewhere in the present disclosure.

It should be noted that the above description of the processing device 120 is provided for the purpose of illustration, and not intended to limit the scope of the present disclosure. For persons having ordinary skills in the art, modules may be combined in various ways, or connected with other modules as sub-systems. For example, in some embodiments, the processing module 440 may include a storage unit for storing instruction(s) to be performed by the processing module 440. As another example, the acquisition module 410 may include a wireless or wired communication unit such as a transceiver for data transmission.

Figure 5:
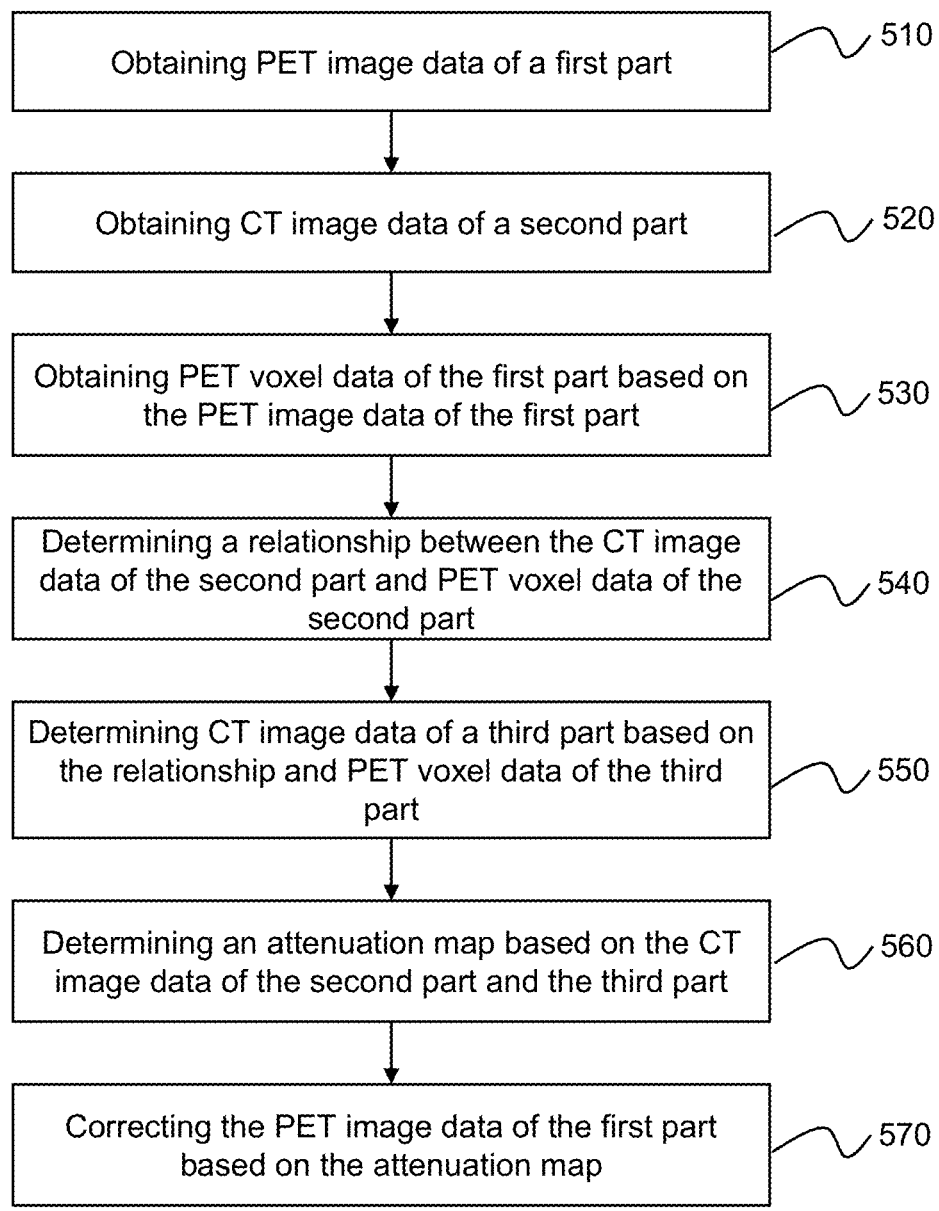
FIG. 5 is a flowchart illustrating an exemplary process for correcting PET image data of a first part of a subject according to some embodiments of the present disclosure.

FIG. 5 is a flowchart illustrating an exemplary process for correcting PET image data of a first part of a subject according to some embodiments of the present disclosure. In some embodiments, one or more operations of process 500 illustrated in FIG. 5 for correcting PET image data of the first part of the subject may be implemented by the processing device 120. In some embodiments, one or more operations of process 500 illustrated in FIG. 5 for correcting PET image data of the first part of the subject may be implemented in the imaging system 100 illustrated in FIG. 1. For example, the process 500 illustrated in FIG. 5 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3). As another example, a portion of the process 500 may be implemented on the scanner 110. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5 and described below is not intended to be limiting.

In 510, PET image data of a first part may be obtained. Operation 510 may be performed by the processing device 120 (e.g., the acquisition module 410). In some embodiments, the PET image data of the first part may be obtained from the scanner 110. In some embodiments, the PET image data generated by the scanner 110 may be stored temporally in the storage device 130, and the processing device 120 may obtain the PET image data from the storage device 130.

In 520, CT image data of a second part may be obtained. Operation 520 may be performed by the processing device 120 (e.g., the acquisition module 410). In some embodiments, the CT image data of the second part may be obtained from the scanner 110. In some embodiments, the CT image data generated by the scanner 110 may be stored temporally in the storage device 130, and the processing device 120 may obtain the CT image data from the storage device 130.

In some embodiments, the subject may be a patient. In some embodiments, the first part may be the whole body of the subject, or any portion thereof. In some embodiments, the whole body may include an upper part of the body, a lower part of the body, or the like, or any combination thereof. The upper part of the body may refer to a portion of the whole body between a cranial vault and a pubic symphysis. For example, the upper part of the body may include an abdomen, a thorax, a back, a head, upper limb(s), etc. The lower part of the body may refer to a portion of the whole body between the pubic symphysis and the toes. For example, the lower part of the body may include legs, feet, etc. In some embodiments, the second part may be a portion of the whole body of the subject. For example, the second part may be a head, a thorax, an abdomen, an upper limb, a lower limb, one or more knee joints, one or more ankle joints, or the like, or any combination thereof. In some embodiments, the first part may include the second part. For example, the first part may be the whole body, and the second part may include the upper part of the body. As another example, the first part may be the whole body, and the second part may include the upper part of the body, the knee joint(s), and/or the ankle joint(s), or the like. As a further example, the first part may be the whole body, and the second part may include the lower part of the body. As still a further example, the first part may be the whole body, and the second part may include the lower part of the body, the thorax, and/or the abdomen, or the like. As still a further example, the first part may be the upper part of the body, and the second part may be the upper limb, the thorax, the abdomen, the head, or the like. As still a further example, the first part may be the lower part of the body, and the second part may be the lower limb, the knee joint(s), the ankle joint(s), the feet, or the like.

In 530, PET voxel data of the first part may be obtained based on the PET image data of the first part. Operation 530 may be performed by the processing device 120 (e.g., the reconstruction module 420). In some embodiments, the PET image data may be raw data that are generated by a PET scanner, and a PET image may be reconstructed based on the PET image data of the first part. In some embodiments, the reconstruction module 420 may reconstruct the PET image according to a reconstruction technique, generate reports including one or more PET images and/or other related information, and/or perform any other function for image reconstruction in accordance with various embodiments of the present disclosure. The reconstruction technique may include an iterative reconstruction algorithm (e.g., a maximum likelihood expectation maximization (MLEM) algorithm, an ordered subset expectation maximization (OSEM) algorithm, maximum-likelihood reconstruction of attenuation and activity (MLAA) algorithm, maximum-likelihood attenuation correction factor (MLACF) algorithm, maximum likelihood transmission reconstruction (MLTR) algorithm, a conjugate gradient algorithm, a maximum-a-posteriori estimation algorithm), a filtered back projection (FBP) algorithm, a 3D reconstruction algorithm, or the like, or any combination thereof. The reconstructed PET image may include a plurality of voxels or pixels. In some embodiments, each voxel or pixel may correspond to a voxel datum. Therefore, the reconstructed PET image may correspond to a plurality of PET voxel data of the first part. In some embodiments, the reconstructed PET image and/or the PET voxel data of the first part may be stored in the storage device 130, or temporally stored in the processing device 120. In some embodiments, the PET image data may be PET voxel data, and the PET voxel data of the first part may be directly obtained from the PET image data of the first part. That is to say, operation 530 may be omitted.

In some embodiments, each PET voxel datum may have a gray value. The gray values in a PET image of a subject may represent a distribution of the radioactive tracer isotope in the subject (e.g., the first part). In some embodiments, the distribution of the radioactive tracer isotope may indicate the radioactivity of the radioactive tracer isotope. The unit of the radioactivity of the radioactive tracer isotope may be Becquerel (Bq). In some embodiments, there may be a relationship between the metabolic rate of the subject and the radioactivity of the radioactive tracer isotope in the subject. If the radioactivity of the radioactive tracer isotope in a region of the subject is relatively high, it may indicate that the metabolic rate of the region of the subject may be relatively high. If the radioactivity of the radioactive tracer isotope in a region of the subject is relatively low, it may indicate that the metabolic rate of the region of the subject may be relatively low. In some embodiments, a relatively high gray value of a PET voxel datum may indicate a relatively high metabolic rate and a relatively high radioactivity of the radioactive tracer isotope. Accordingly, a relatively low gray value of a PET voxel datum may indicate a relatively low metabolic rate and a relatively low radioactivity of the radioactive tracer isotope. Therefore, the gray values of the PET voxel data may reflect the metabolic rates of different regions in the subject. For example, a tissue or a lesion that has a relatively high metabolic rate may correspond to PET voxel data with relatively high gray values. As another example, a tissue or a lesion that has a relatively low metabolic rate may correspond to PET voxel data with relatively low gray values.

In 540, a relationship between the CT image data of the second part and PET voxel data of the second part may be obtained. Operation 540 may be performed by the processing device 120 (e.g., the mapping module 430). In some embodiments, the CT image data of the second part may be raw data that are generated by a CT scanner, and a CT image may be reconstructed based on the CT image data of the second part. In some embodiments, the reconstruction module 420 may reconstruct the CT image according to a reconstruction technique described elsewhere in the present disclosure. The reconstructed CT image may include a plurality of voxels or pixels. In some embodiments, each voxel or pixel may correspond to a voxel datum. Therefore, the reconstructed CT image may correspond to a plurality of CT voxel data of the second part.

In some embodiments, the CT image data may be CT voxel data. In some embodiments, each CT voxel datum may have a CT value. The CT values of the CT image may represent quantified tissue densities in the subject (e.g., the second part). In some embodiments, the CT values may be generated based on X-ray attenuation coefficients detected by a CT scanner. The unit of a CT value may be Hounsfield (Hu). In some embodiments, the CT values may be expressed by gray values in the CT image. That is, the gray values may reflect the tissue densities in the subject. For example, a relatively high gray value may indicate a relatively high tissue density, while a relatively low gray value may indicate a relatively low tissue density. It should be noted that in some embodiments, the color of a CT image may be reversed. After color reversing, a relatively low gray value may indicate a relatively high tissue density, while a relatively high gray value may indicate a relatively low tissue density.

Merely by way of example, in some embodiments, the CT value of water may be 0 Hu, the CT value of osseous tissue may be larger than 1000 Hu, and the CT value of air may be −1000 Hu. Accordingly, the CT value of soft tissue may be within the range of 20-50 Hu, and the CT value of adipose tissue may be within the range of −40-90 Hu. Therefore, the tissue of the subject may be generally classified as water, osseous tissue, air, soft tissue, and adipose tissue.

In some embodiments, the mapping module 430 may determine the relationship between the CT image data and the PET voxel data of the second part. In some embodiments, the first part may include the second part, and the PET voxel data of the second part may be directly obtained from the PET voxel data of the first part. In some embodiments, a CT image datum may correspond to a PET voxel datum, and there may be a correspondence between a CT value and a PET gray value. In some embodiments, an average value may be determined for one or more same or similar CT values or PET gray values to determine the relationship. In some embodiments, the relationship may be expressed by one or more functions. The function(s) may include a polynomial function, a trigonometric function, a proportional function, an inverse proportional function, an exponential function, a logarithmic function, or the like, or any combination thereof.

In some embodiments, the relationship may be expressed in the form of a mapping table. In some embodiments, the mapping module 430 may include a storage unit in which the mapping table may be stored. In some embodiments, the mapping table may be stored in the storage device 130, and the mapping module 430 may obtain the mapping table through the acquisition module 410 from the storage device 130.

In 550, CT image data of a third part may be determined based on the relationship and PET voxel data of the third part. Operation 550 may be performed by the processing device 120 (e.g., the processing module 440). In some embodiments, the third part may be a portion of the first part. In some embodiments, the third part may be different from the second part. In some embodiments, the third part may be the rest part of the first part excluding the second part, or at least a portion of the rest part. For example, if the first part is the whole body, and the second part is the upper part of the body, then the third part may be the lower part of the body or a portion (e.g., an osseous tissue region) of the lower part of the body. As another example, if the first part is the whole body, and the second part is the lower part of the body, then the third part may be the upper part of the body or a portion of the upper part of the body. In some embodiments, as the first part includes the third part, the PET voxel data of the first part may be directly obtained from the PET voxel data of the first part.

In some embodiments, a relationship between the CT image data of the third part and the PET voxel data of the third part may be similar or the same as the relationship between the CT image data of the second part and the PET voxel data of the third part. Therefore, the CT image data of the third part may be determined based on the relationship determined in 540 and the PET voxel data of the third part. In some embodiments, the CT image data of the third part may be determined by looking up a mapping table (e.g., the mapping table determined in 540) according to the PET voxel data of the third part. In some embodiments, a PET gray value of a pixel or voxel of the third part may be found on the mapping table, and then a corresponding CT value of the same pixel or voxel may be read from the mapping table. In some embodiments, a PET gray value of a pixel or voxel of the third part may not be found on the mapping table, and the corresponding CT value may not be directly read from the mapping table. In this case, the CT value may be determined by interpolation or fitting. In some embodiments, the third part may be segmented into an osseous tissue region and a non-osseous tissue region. In some embodiments, the processing device 120 may determine CT image data of the osseous tissue region. More descriptions of the determination of the CT image data of the third part may be found elsewhere in the present disclosure (e.g., FIG. 6 and the description thereof).

For example, CT values of the voxels or pixels of the second part may be 1000 Hu, 2000 Hu, . . . , and the corresponding PET gray values of the second part may be $n_1$, $n_2$, . . . . A relationship may be determined based on the CT values (i.e., 1000 Hu, 2000 Hu, . . . ) and the PET gray values (i.e., $n_1$, $n_2$, . . . ). If the PET gray values of the third part (e.g., the osseous tissue region) are $m_1$, $m_2$, . . . , then the CT values of the third part (e.g., the osseous tissue region) may be determined by interpolation or fitting based on the relationship.

In 560, an attenuation map may be determined based on the CT image data of the second part and the CT image data of the third part. Operation 560 may be performed by the attenuation coefficient determination module 450. The attenuation map may show a plurality of attenuation coefficients of radiation rays (e.g., γ rays) emitted from the scanned subject. The attenuation map may include a plurality of attenuation coefficients. In some embodiments, the attenuation map may be transmitted to the correction module 460 for further processing. More descriptions of the determination of the attenuation map may be found elsewhere in the present disclosure (e.g., FIG. 7 and the description thereof).

In 570, the PET image data of the first part may be corrected based on the attenuation map. Operation 570 may be performed by the correction module 460. In some embodiments, the corrected PET image data may be reconstructed to a corrected PET image. The corrected PET image may be displayed on a user interface, (e.g., the I/O 230) for diagnosis, or may be stored in the storage device 130. More descriptions of the correction of the PET image data may be found elsewhere in the present disclosure (e.g., FIG. 8 and the description thereof).

The CT image data of the third part can be determined based on the PET voxel data of the third part and the relationship between the CT image data of the second part and the PET voxel data of the second part. That is, the CT image data of the third part can be obtained without scanning the third part using a CT scanner. Therefore, the radiation dose introduced to the subject can be reduced.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the operations 510 and 520 may be integrated into a single operation.

Figure 6:
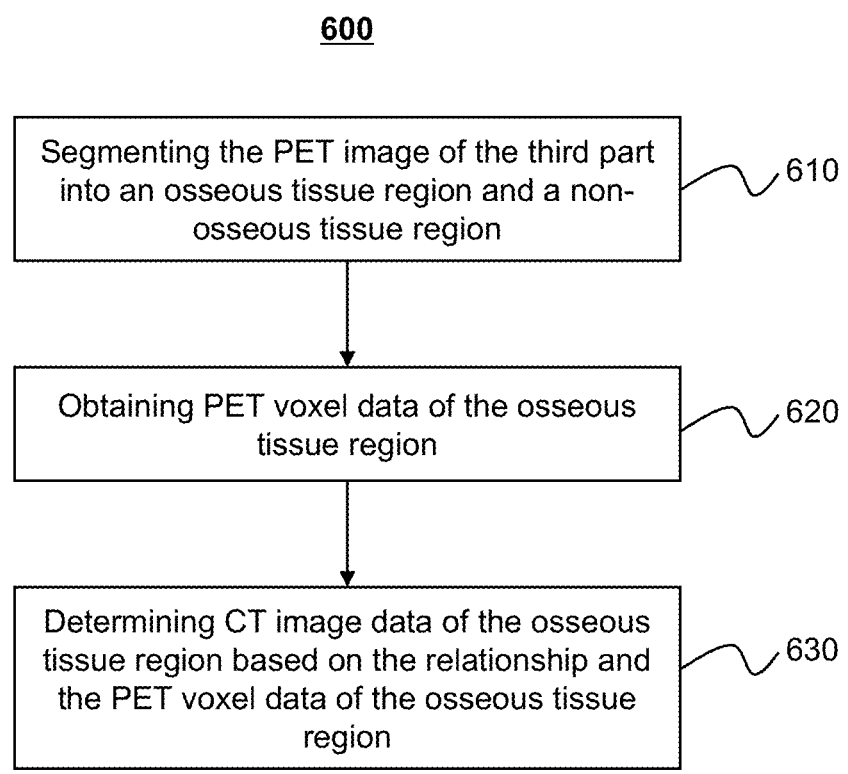
FIG. 6 is a flowchart illustrating an exemplary process for determining CT image data of a third part of the subject according to some embodiments of the present disclosure.

FIG. 6 is a flowchart illustrating an exemplary process for determining CT image data of a third part of the subject according to some embodiments of the present disclosure. In some embodiments, one or more operations of process 600 illustrated in FIG. 6 for determining CT image data of the third part of the subject may be performed by the processing device 120 (e.g., the processing module 440). In some embodiments, one or more operations of process 600 illustrated in FIG. 6 for determining CT image data of the third part of the subject may be implemented in the imaging system 100 illustrated in FIG. 1. For example, the process 600 illustrated in FIG. 6 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3). As another example, a portion of the process 600 may be implemented on the scanner 110. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting. In some embodiments, operation 550 illustrated in FIG. 5 may be performed according to the process 600.

In 610, the PET image of the third part may be segmented into an osseous tissue region and a non-osseous tissue region. The osseous tissue region may include one or more voxels or pixels corresponding to one or more bones in the third part. The non-osseous tissue region may include one or more voxels or pixels corresponding to tissues excluding bones (e.g., soft tissue, water, adipose tissue, air, etc.). In some embodiments, the osseous tissue region may have a relatively low metabolic rate than the non-osseous tissue region. In some embodiments, the osseous tissue region may be a region of interest for attenuation correction of the PET image. Therefore, it would be desirable to segment the osseous tissue region from the PET image of the third part.

In some embodiments, the PET image of the third part may be segmented based on one or more segmentation algorithms. In some embodiments, the segmentation algorithms may include a threshold segmentation algorithm, a region growing segmentation algorithm, an energy-based 3D reconstruction segmentation algorithm, a level set-based segmentation algorithm, a region split and/or merge segmentation algorithm, an edge tracking segmentation algorithm, a statistical pattern recognition algorithm, a C-means clustering segmentation algorithm, a deformable model segmentation algorithm, a graph search segmentation algorithm, a neural network segmentation algorithm, a geodesic minimal path segmentation algorithm, a target tracking segmentation algorithm, an atlas-based segmentation algorithm, a rule-based segmentation algorithm, a coupled surface segmentation algorithm, a model-based segmentation algorithm, a deformable organism segmentation algorithm, a model matching algorithm, an artificial intelligence algorithm, or the like, or any combination thereof. For example, the segmentation algorithm may be a region growing algorithm. In region growing, one or more voxels or pixels may be set as a seed for growing the osseous tissue. Then one or more neighboring voxels or pixels of the seed with gray value(s) that satisfy a pre-determined condition may be incorporated with the seed. The pre-determined condition may relate to a gray value threshold, a gray value difference between the neighboring voxels (or pixels) and the seed, or the like, or any combination thereof. In some embodiments, the neighboring voxels or pixels that satisfy the pre-determined condition may have the same or similar gray values. The region growing operation may be repeated until all the voxels or pixels with the same or similar gray values are incorporated with the seed, and accordingly, the osseous tissue region may be obtained. As the osseous tissue region is obtained, the non-osseous tissue region may be directly obtained from the PET image of the third part. In some embodiments, the segmentation algorithm(s) may be stored in the storage device 130, the storage 220, the storage 390, or another mobile storage device (e.g., a mobile hard disk, a USB flash disk, or the like, or a combination thereof). In some embodiments, the segmentation algorithm(s) may be retrieved from one or more other external sources via the network 150.

In 620, PET voxel data of the osseous tissue region may be obtained. In some embodiments, as the osseous tissue region is segmented, the voxels or voxels belonging to the osseous tissue region may be determined, and accordingly, the PET voxel data of the osseous tissue region may be obtained. In some embodiments, PET voxel data of the non-osseous tissue region may be obtained.

In 630, CT image data of the osseous tissue region may be determined based on the relationship and the PET voxel data of the osseous tissue region. In some embodiments, a PET gray value of a pixel or voxel of the osseous tissue region may be found on a mapping table (e.g., the mapping table determined in 540), and then a corresponding CT value of the same pixel or voxel may be read from the mapping table. In some embodiments, a PET gray value of a pixel or voxel of the osseous tissue region may not be found on the mapping table, and the corresponding CT value may not be directly read from the mapping table. In this case, the CT value may be determined by interpolation or fitting. In some embodiments, CT image data of the non-osseous tissue region may be determined based on the relationship and the PET voxel data of the non-osseous tissue region.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the CT image data of the non-osseous tissue region may be determined in a similar way, and a CT image of the third part may be reconstructed based on the CT image data of the osseous tissue region and the CT image data of the non-osseous tissue region.

Figure 7:
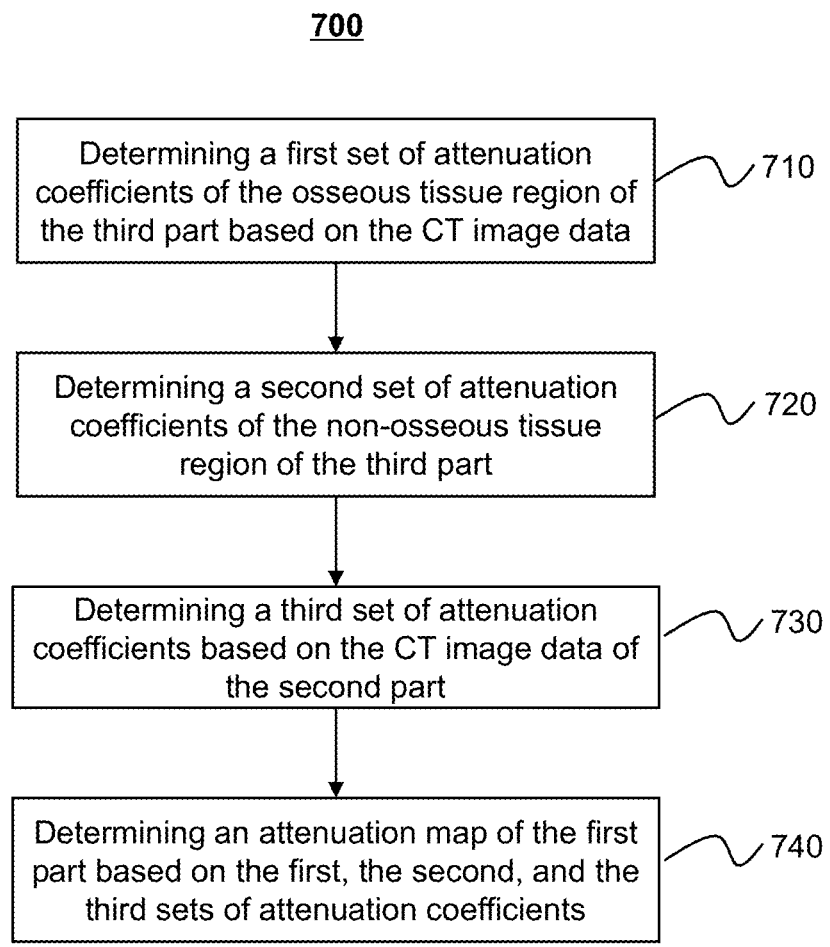
FIG. 7 is a flowchart illustrating an exemplary process for determining an attenuation map according to some embodiments of the present disclosure.

FIG. 7 is a flowchart illustrating an exemplary process for determining an attenuation map according to some embodiments of the present disclosure. In some embodiments, one or more operations of process 700 illustrated in FIG. 7 for determining the attenuation map may be performed by the processing device 120 (e.g., the attenuation coefficient determination module 450). In some embodiments, one or more operations of process 700 illustrated in FIG. 7 for determining the attenuation map may be implemented in the imaging system 100 illustrated in FIG. 1. For example, the process 700 illustrated in FIG. 7 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3). As another example, a portion of the process 700 may be implemented on the scanner 110. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 7 and described below is not intended to be limiting. In some embodiments, operation 560 illustrated in FIG. 5 may be performed according to the process 700.

In 710, a first set of attenuation coefficients of the osseous tissue region of the third part may be determined based on the CT image data (e.g., the CT image data of the osseous tissue region of the third part). In some embodiments, each CT voxel or pixel of the osseous tissue region of the third part may correspond to an attenuation coefficient of the first set of attenuation coefficients. The first set of attenuation coefficients may refer to the attenuation coefficients of γ rays emitted from the subject. In some embodiments, the first set of attenuation coefficients may be further determined based on a first conversion relation. The first conversion relation may indicate a conversion relation between a plurality of attenuation coefficients and a plurality of CT values within in a first range. In some embodiments, the first conversion relation may be a traditional linear conversion relation that is used in PET image correction based on CT image data. More descriptions of the first conversion relation may be found elsewhere in the present disclosure (e.g., FIG. 11 and the description thereof).

It should be noted that tissues in different parts of a subject may have a certain consistency. Therefore, the relationship between CT image data and PET voxel data in the second part may also be suitable for the third part. Thus, the CT image data of the third part may be determined based on the PET voxel data in the third part and the relationship. Accordingly, the CT values may be determined based on the CT image data of the third part. Further, the first set of attenuation coefficients may be determined based on the first conversion relation and the CT values. In some embodiments, the first set of attenuation coefficients may be directly set according to a user input or a default setting of the imaging system 100. In some embodiments, the first set of attenuation coefficients determined based on the relationship between CT image data and PET voxel data in the second part may have relatively high accuracy and/or relatively high reliability.

In 720, a second set of attenuation coefficients of the non-osseous tissue region of the third part may be determined. In some embodiments, each CT voxel or pixel of the non-osseous tissue region of the third part may correspond to an attenuation coefficient of the second set of attenuation coefficients. In some embodiments, as the non-osseous tissue region generally includes soft tissue, adipose tissue, air, and/or water, the attenuation coefficients of soft tissue and adipose tissue are similar as that of water, and the level of air in the third part is relatively low, the second set of attenuation coefficients may be set as a value that equals to the attenuation coefficient of water.

In some embodiments, the second set of attenuation coefficients may be determined based on a second conversion relation and the CT image data of the non-osseous tissue region. The second conversion relation may indicate a conversion relation between a plurality of attenuation coefficients and a plurality of CT values within in a second range. In some embodiments, the second conversion relation may be a traditional linear conversion relation that is used in PET image correction based on CT image data. More descriptions of the second conversion relation may be found elsewhere in the present disclosure (e.g., FIG. 11 and the description thereof).

In 730, a third set of attenuation coefficients may be determined based on the CT image data of the second part. In some embodiments, each CT voxel or pixel of the second part may correspond to an attenuation coefficient of the third set of attenuation coefficients. In some embodiments, the third set of attenuation coefficients may be determined according to the first conversion relation and/or the second conversion relation as described in FIG. 11.

In 740, an attenuation map of the first part may be determined based on the first, the second, and the third sets of attenuation coefficients.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 720 and/or operation 730 may be performed before operation 710.

Figure 8:
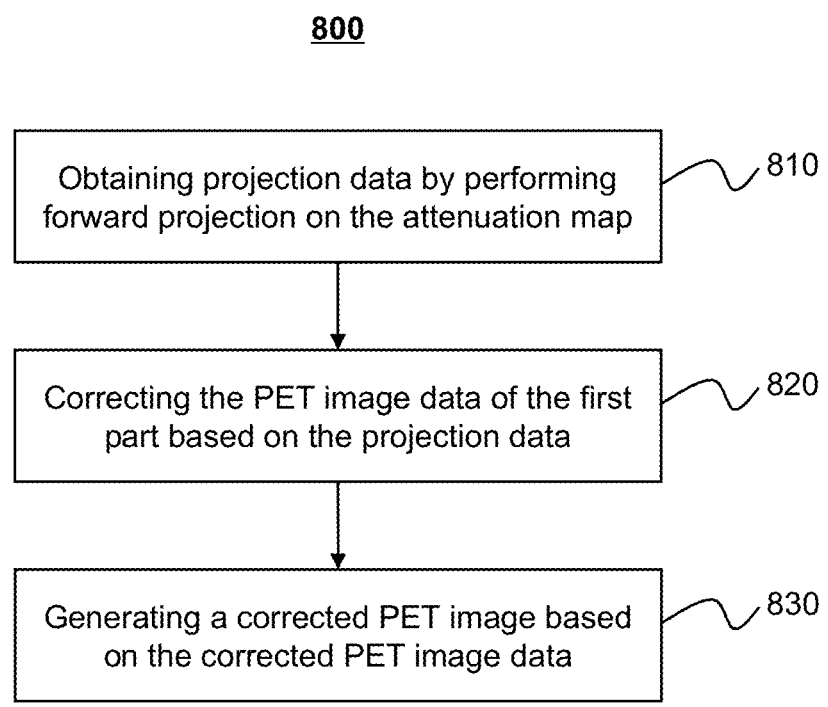
FIG. 8 is a flowchart illustrating an exemplary process for generating a corrected PET image according to some embodiments of the present disclosure.

FIG. 8 is a flowchart illustrating an exemplary process for generating a corrected PET image according to some embodiments of the present disclosure. In some embodiments, one or more operations of process 800 illustrated in FIG. 8 for generating the corrected PET image may be performed by the processing device 120 (e.g., the correction module 460). In some embodiments, one or more operations of process 800 illustrated in FIG. 8 for generating the corrected PET image may be implemented in the imaging system 100 illustrated in FIG. 1. For example, the process 800 illustrated in FIG. 8 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3). As another example, a portion of the process 800 may be implemented on the scanner 110. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 8 and described below is not intended to be limiting. In some embodiments, operation 570 illustrated in FIG. 5 may be performed according to the process 800.

In 810, projection data may be obtained by performing forward projection on the attenuation map.

In 820, the PET image data of the first part may be corrected based on the projection data. In some embodiments, the PET image data may be obtained from the acquisition module 410, the reconstruction module 420, the mapping module 430, and/or the processing module 440. In some embodiments, processing device 120 (e.g., the correction module 460) may correct the PET image data based on one or more correction techniques. The correction technique may include a random correction, a scatter correction, an attenuation correction, a dead time correction, normalization, or the like, or any combination thereof.

In 830, a corrected PET image may be generated based on the corrected PET image data. In some embodiments, the corrected PET image may be generated based on one or more reconstruction techniques described elsewhere in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the generation of the corrected PET image may be performed by the reconstruction module 420. As another example, the forward projection may be performed by the processing module 440.

Figure 9:
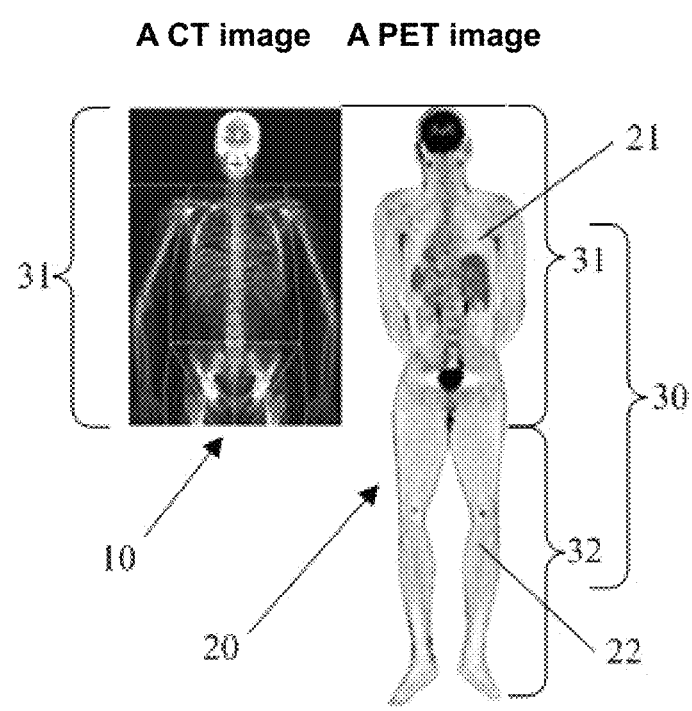
FIG. 9 is a schematic diagram illustrating an exemplary CT image of an upper part of a body and an exemplary PET image of a whole body according to some embodiments of the present disclosure.

FIG. 9 is a schematic diagram illustrating an exemplary CT image of an upper part of a body and an exemplary PET image of a whole body according to some embodiments of the present disclosure. As shown in FIG. 9, the PET image 20 of the whole body 30 includes a PET image 21 of the upper part of the body 31 and a PET image 22 of the lower part of the body 32. The CT image 10 of the upper part of the body 31 is also shown in FIG. 9. The PET images 20 was reconstructed based on the PET image data of the whole body. The CT image 10 was reconstructed based on the CT image data of the upper part of the body. A relationship between the CT image data in the CT image 10 of the upper part of the body 31 and the PET voxel data in the PET image 21 of the upper part of the body 31 was obtained. Then CT image data of the lower part of the body 32 may be determined based on PET voxel data in the PET image 22 of the lower part of the body 32 and the relationship. An osseous tissue region and/or a non-osseous tissue region may be segmented from the lower part of the body 32. A first set of attenuation coefficients of the osseous tissue region of the lower part of the body 32 may be obtained based on the CT image data of the osseous tissue region of the lower part of the body 32. A second set of attenuation coefficients of the non-osseous tissue region of the lower part of the body 32 may be obtained based on the CT image data of the non-osseous tissue region of the lower part of the body 32. A third sets of attenuation coefficients may be determined based on the CT image data in the CT image 10 of the upper part of the body 31. Then an attenuation map may be obtained based on the first, the second, and the third sets of attenuation coefficients. PET image data of the whole body 30 may be corrected based on the attenuation map. A corrected PET image may be generated based on the corrected PET image data.

Figure 10:
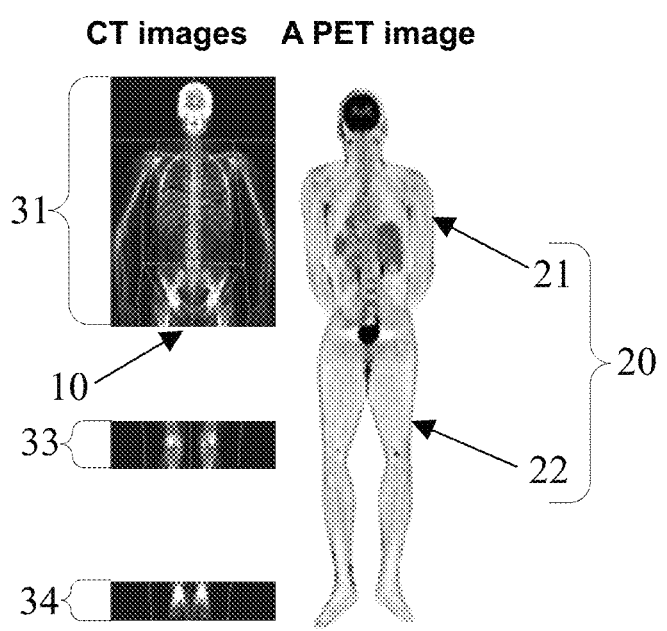
FIG. 10 is a schematic diagram illustrating exemplary CT images of an upper part of a body, knee joints, and ankle joints, and an exemplary PET image of a whole body according to some embodiments of the present disclosure.

In some embodiments, one or more portions in joint regions (e.g., ligament, meniscus, etc.) may have similar metabolic rate as osseous tissue region, and then the gray values of these portions may be similar as those of the osseous tissue region. Therefore, these portions may introduce an error in the segmentation of the osseous tissue region of the lower part of the body 32, and accordingly, the accuracy of the first sets of attenuation coefficients may be affected. In some embodiments, it would be desirable to scan these portions and obtain CT image data of these portions to improve the accuracy of the first sets of attenuation coefficients. FIG. 10 is a schematic diagram illustrating exemplary CT images of an upper part of a body, knee joints, and ankle joints, and an exemplary PET image of a whole body according to some embodiments of the present disclosure. As shown in FIG. 10, the PET image 20 of the whole body may include a PET image 21 of the upper part of the body and a PET image 22 of the lower part of the body. The CT images may include a CT image 10 of the upper part of the body 31, a CT image of the knee joints 33 and a CT image of ankle joints 34. In this case, the first part may be the whole body, the second part may include the upper part of the body 31, the knee joints 33, and the ankle joints 34, and the third part may be the region of the lower part of the body excluding the knee joints 33 and the ankle joints 34.

It should be noted that the above description of the processing module is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the second part may include one or more other organs in the body. As another example, the three CT images of the upper part of the body 31, the knee joint 33, and the ankle joints 34 may be detected under different radiation doses of γ rays.

Figure 11:
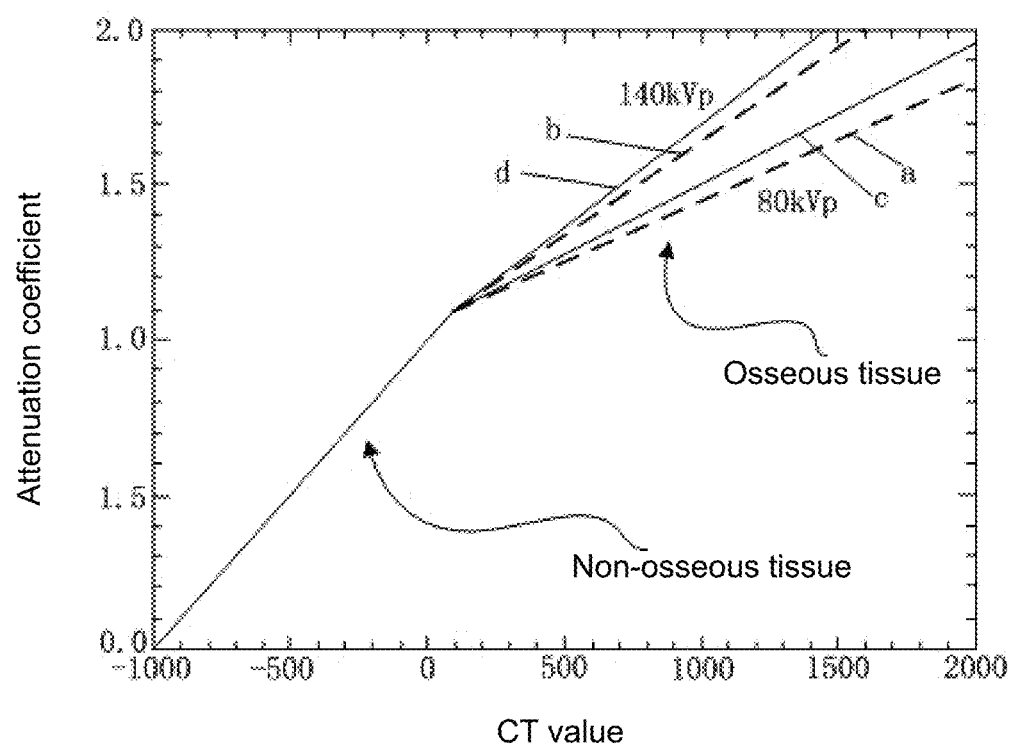
FIG. 11 is a schematic diagram illustrating exemplary conversion relations between CT values and attenuation coefficients of γ rays according to some embodiments of the present disclosure.

FIG. 11 is a schematic diagram illustrating exemplary conversion relations between CT values and attenuation coefficients of γ rays according to some embodiments of the present disclosure. In some embodiments, the first, the second, and/or the third sets of attenuation coefficients may be determined based on the curve.

As shown in FIG. 11, the conversion relations between the attenuation coefficients and the CT values may be linear. The horizontal axis indicates CT values, and the vertical axis indicates attenuation coefficients. The attenuation coefficients of γ rays may be determined relative to the electron density of water, and may have no unit. In some embodiments, the first conversion relation may be expressed as Equation (1):

$$\mu_1 = \begin{cases} a_1(CT) + b_1, & k_1 \\ a_2(CT) + b_2, & k_2 \\ \ldots \ldots \ldots \ldots \\ a_N(CT) + b_N, & k_N \end{cases}, \quad (1)$$

where $\mu_1$ may be the first sets of attenuation coefficients of the osseous tissue region of the third part, $k_1, k_2, \ldots, k_N$ may be different radiation intensities of the X-rays for obtaining the CT image data of the second part, $a_1, a_2, \ldots, a_N$ and $b_1, b_2, \ldots, b_N$ may be constants greater than zero under different radiation intensities, N may be a natural number greater than zero, and the symbol "CT" may represent the CT values with unit Hu. In some embodiments, Equation (1) may be simplified as $\mu_1 = a_{n,k_n}(CT) + b_n$, wherein n=1, 2, ... N.

For example, if the radiation intensity is 80 kVp (see the dash line labelled as "a" in FIG. 11), the conversion relation may be expressed as $\mu_{80kVp} = 0.0004(CT) + 1$, in which the CT value may be no less than 0 Hu. As another example, if the radiation intensity is 140 kVp (see the dash line labelled as "b" in FIG. 11), the conversion relation may be expressed as $\mu_{140kVp} = 0.000625(CT) + 1$, in which the CT value may be no less than 0 Hu.

As shown in FIG. 11, there is a solid line labelled as "c" near the dash line labelled as "a" and a solid line labelled as "d" near the dash line labelled as "b". The dash line "a" and the dash line "b" are experimental relations between the CT values and the attenuation coefficients under 80 kVp and 140 kVp respectively, while the solid line "c" and the solid line "d" are clinical relations between the CT values and the attenuation coefficients under 80 kVp and 140 kVp respectively. There may be an error between the experimental relations and the clinical relations. However, the error is within an acceptable and tolerable range.

In some embodiments, the second conversion relation of the non-osseous tissue region may be expressed as Equation (2):

$$\mu_2 = a'(CT) + b', \quad (2)$$

where $\mu_2$ may be the second set of attenuation coefficients of the non-osseous tissue region of the third part, a', b' may be constants greater than zero, and the CT value may be no less than 0 Hu. Merely by way of example, the second conversion relation may be expressed as $\mu_2 = 0.001(CT) + 1$.

In some embodiments, the second set of attenuation coefficients may be directly determined as the value that equals to the attenuation coefficient of water.

As shown in FIG. 11, the line(s) indicating the second conversion relation of the non-osseous tissue region and the line indicating the first conversion relation of the osseous tissue region may share a common end point, which may benefit the segmentation of non-osseous tissue region and osseous tissue region in the corrected PET image.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments.

In some embodiments, a tangible and non-transitory machine-readable medium or media having instructions recorded thereon for a processor or computer to operate an imaging system to perform one or more functions of the modules or units described elsewhere herein.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing processing device or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method implemented on a computing machine having at least one processor and at least one storage device, the method comprising:

obtaining a PET image generated based on PET image data of a first part of a subject, the PET image including PET voxel data, and the first part of the subject including a second part and a third part;

obtaining a CT image of the second part generated based on CT image data of the second part, the CT image of the second part including multiple CT voxels;

determining a relationship between the CT image of the second part and PET voxel data of the second part, wherein the relationship is related to a correspondence between CT values of pixels or voxels of the CT image and PET gray values of corresponding pixels or voxels of the PET image;

segmenting PET image of the third part into an osseous tissue region and a non-osseous tissue region;

obtaining PET voxel data of the osseous tissue region of the third part and PET voxel data of the non-osseous tissue region of the third part;

determining CT image data of the osseous tissue region based on the relationship and the PET voxel data of the osseous tissue region, the CT image data of the osseous tissue region including CT values of the osseous tissue region;

determining CT image data of the non-osseous tissue region based on the relationship and the PET voxel data of the non-osseous tissue region, the CT image data of the non-osseous tissue region including CT values of the non-osseous tissue region, determining a first set of attenuation coefficients based on the CT image data of the osseous tissue region of the third part and a first linear conversion relation, the first linear conversion relation indicating a conversion relation between a plurality of attenuation coefficients and a plurality of CT values within in a first range that corresponds to an osseous tissue;

determining a second set of attenuation coefficients of the non-osseous tissue region of the third part based on the CT image data of the non-osseous tissue region of the third part and a second linear conversion relation, the second linear conversion relation indicating a conversion relation between a plurality of attenuation coefficients and a plurality of CT values within in a second range that corresponds to a non-osseous tissue;

determining a third set of attenuation coefficients based on the CT image data of the second part; and determining an attenuation map based on the first set of attenuation coefficients, the second set of attenuation coefficients, and the third set of attenuation coefficients.

2. The method according to claim 1, wherein the first part is a whole body of the subject, and the second part is at least one part of thorax, abdomen, upper limb, or lower limb of the subject.

3. The method according to claim 1, wherein the relationship between the CT image of the second part and the PET voxel data of the second part indicates correspondence between a first average value of values of one or more CT voxels and a second average value of values of one or more PET voxels in an osseous tissue region or a non-osseous tissue region of the second part.

4. The method according to claim 1, wherein the relationship between the CT image of the second part and the PET voxel data of the second part is expressed in a form of a mapping table or by one or more functions including at least one of a polynomial function, a trigonometric function, a proportional function, an inverse proportional function, an exponential function, or a logarithmic function.

5. The method according to claim 1, wherein the relationship between the CT image of the second part and the PET voxel data of the second part is stored in a storage unit.

6. The method according to claim 1, wherein the CT image data of the osseous tissue region is determined by interpolation or fitting.

7. The method according to claim 1, wherein the first range is no less than 0 Hu, and the second range is less than 0 Hu.

8. The method according to claim 1, wherein the first linear conversion relation relates to radiation intensities of X-rays for obtaining the CT image data of the second part, and the second linear conversion relation is irrelevant to radiation intensities of the X-rays for obtaining the CT image data of the second part.

9. The method of claim 1, further comprising:

correcting the PET image data based on the attenuation map; and generating a corrected image based on the corrected PET image data.

10. A system comprising:

at least one storage device including a set of instructions or programs; and at least one processor configured to communicate with the at least one storage device, wherein when executing the set of instructions or programs, the at least one processor is configured to cause the system to perform operations including:

obtaining a PET image generated based on PET image data of a first part of a subject, the PET image including PET voxel data, and the first part of the subject including a second part and a third part;

obtaining a CT image of the second part generated based on CT image data of the second part, the CT image of the second part including multiple CT voxels;

determining a relationship between the CT image of the second part and PET voxel data of the second part, wherein the relationship is related to a correspondence between CT values of pixels or voxels of the CT image and PET gray values of corresponding pixels or voxels of the PET image;

segmenting PET image of the third part into an osseous tissue region and a non-osseous tissue region;

obtaining PET voxel data of the osseous tissue region of the third part and PET voxel data of the non-osseous tissue region of the third part;

determining CT image data of the osseous tissue region based on the relationship and the PET voxel data of the osseous tissue region, the CT image data of the osseous tissue region including CT values of the osseous tissue region;

determining CT image data of the non-osseous tissue region based on the relationship and the PET voxel data of the non-osseous tissue region, the CT image data of the non-osseous tissue region including CT values of the non-osseous tissue region, determining a first set of attenuation coefficients based on the CT image data of the osseous tissue region of the third part and a first linear conversion relation, the first linear conversion relation indicating a conversion relation between a plurality of attenuation coefficients and a plurality of CT values within in a first range that corresponds to an osseous tissue;

determining a second set of attenuation coefficients of the non-osseous tissue region of the third part based on the CT image data of the non-osseous tissue region of the third part and a second linear conversion relation, the second linear conversion relation indicating a conversion relation between a plurality of attenuation coefficients and a plurality of CT values within in a second range that corresponds to a non-osseous tissue;

determining a third set of attenuation coefficients based on the CT image data of the second part; and determining an attenuation map based on the first set of attenuation coefficients, the second set of attenuation coefficients, and the third set of attenuation coefficients.

11. The system according to claim 10, wherein the first part is a whole body of the subject, and the second part is at least one part of thorax, abdomen, upper limb, or lower limb of the subject.

12. The system according to claim 10, wherein the relationship between the CT image of the second part and the PET voxel data of the second part indicates correspondence between a first average value of values of one or more CT voxels and a second average value of values of one or more PET voxels in an osseous tissue region or a non-osseous tissue region of the second part.

13. The system according to claim 10, wherein the relationship between the CT image of the second part and the PET voxel data of the second part is expressed in a form of a mapping table or by one or more functions including at least one of a polynomial function, a trigonometric function, a proportional function, an inverse proportional function, an exponential function, or a logarithmic function.

14. The system according to claim 10, wherein the relationship between the CT image of the second part and the PET voxel data of the second part is stored in a storage unit.

15. The system according to claim 10, wherein the CT image data of the osseous tissue region is determined by interpolation or fitting.

16. The system according to claim 10, wherein the first range is no less than 0 Hu, and the second range is less than 0 Hu.

17. The system according to claim 10, wherein the first linear conversion relation relates to radiation intensities of X-rays for obtaining the CT image data of the second part, and the second linear conversion relation is irrelevant to radiation intensities of the X-rays for obtaining the CT image data of the second part.

18. The system of claim 10, further comprising:
correcting the PET image data based on the attenuation map; and
generating a corrected image based on the corrected PET image data.

19. A non-transitory computer readable medium embodying a computer program product, the computer program product comprising instructions configured to cause a computing device to perform a method, the method comprising:

obtaining a PET image generated based on PET image data of a first part of a subject, the PET image including PET voxel data, and the first part of the subject including a second part and a third part;

obtaining a CT image of the second part generated based on CT image data of the second part, the CT image of the second part including multiple CT voxels;

determining a relationship between the CT image of the second part and PET voxel data of the second part, wherein the relationship is related to a correspondence between CT values of pixels or voxels of the CT image and PET gray values of corresponding pixels or voxels of the PET image;

segmenting PET image of the third part into an osseous tissue region and a non-osseous tissue region;

obtaining PET voxel data of the osseous tissue region of the third part and PET voxel data of the non-osseous tissue region of the third part;

determining CT image data of the osseous tissue region based on the relationship and the PET voxel data of the osseous tissue region, the CT image data of the osseous tissue region including CT values of the osseous tissue region;

determining CT image data of the non-osseous tissue region based on the relationship and the PET voxel data of the non-osseous tissue region, the CT image data of the non-osseous tissue region including CT values of the non-osseous tissue region, determining a first set of attenuation coefficients based on the CT image data of the osseous tissue region of the third part and a first linear conversion relation, the first linear conversion relation indicating a conversion relation between a plurality of attenuation coefficients and a plurality of CT values within in a first range that corresponds to an osseous tissue;

determining a second set of attenuation coefficients of the non-osseous tissue region of the third part based on the CT image data of the non-osseous tissue region of the third part and a second linear conversion relation, the second linear conversion relation indicating a conversion relation between a plurality of attenuation coefficients and a plurality of CT values within in a second range that corresponds to a non-osseous tissue;

determining a third set of attenuation coefficients based on the CT image data of the second part; and determining an attenuation map based on the first set of attenuation coefficients, the second set of attenuation coefficients, and the third set of attenuation coefficients.

20. The non-transitory computer readable medium of claim 19, wherein the method further comprises:
   correcting the PET image data based on the attenuation map; and
   generating a corrected image based on the corrected PET image data.

* * * * *